United States Patent [19]
Dow et al.

[11] 3,816,782
[45] June 11, 1974

[54] THRUST LOAD EQUALIZER FOR AN ELECTRIC MOTOR

[75] Inventors: Bobby F. Dow, Collinsville, Ill.;
Herbert G. Fellner, Ferguson, Mo.

[73] Assignee: Emerson Electric Co., St. Louis, Mo.

[22] Filed: July 10, 1972

[21] Appl. No.: 270,433

[52] U.S. Cl. ................. 310/90, 308/160, 308/163
[51] Int. Cl. ..................... F16c 17/04, F16c 31/00
[58] Field of Search ............... 310/90; 308/160, 163

[56] References Cited
UNITED STATES PATENTS

| | | | |
|---|---|---|---|
| 2,630,354 | 3/1953 | Burks | 308/160 |
| 2,947,893 | 8/1960 | Bussone | 310/90 |
| 3,002,794 | 10/1961 | Bluemink | 310/90 X |
| 3,038,765 | 6/1962 | Tupper | 310/90 X |
| 3,679,277 | 7/1972 | Dohmen | 310/90 X |

Primary Examiner—J. D. Miller
Assistant Examiner—Robert J. Hickey
Attorney, Agent, or Firm—Polster and Polster

[57] ABSTRACT

A motor has an improved thrust distribution system. A plurality of thrust bearing means are placed along the motor shaft to distribute the axial load during motor operation. One of the bearing means carries substantially the entire thrust load in a first axial direction along the motor shaft. At least two other bearing means distribute the thrust load in a second axial direction along the motor shaft. The last mentioned bearing means include a fixed bearing on a first end of the motor shaft and the floating bearing on the second end of the motor shaft which is spring biased to loading condition, thereby sharing the axial load with the fixed bearing.

14 Claims, 8 Drawing Figures

PATENTED JUN 11 1974 3,816,782

3,816,782

THRUST LOAD EQUALIZER FOR AN ELECTRIC MOTOR

BACKGROUND OF THE INVENTION

This invention relates to thrust system and in particular to a system adapted for use with electric motors. While the invention is described with particular emphasis in a motor utilized for household dishwasher applications, those skilled in the art will recognize the wide applicability of the concept of our invention to other thrust bearing systems.

Houswhold dishwashers are well known in the art. In these applications, an electrical motor is used to drive a water pump mounted on one end of a motor shaft. The shaft, of course, is operatively connected to the motor rotor and the rotor rotates in response to flux patterns established by the motor windings in accordance with well known electrical-mechanical principles. The motor conventionally is bi-direction, a first direction of rotor rotation corresponding to the wash mode for the dishwasher and a second direction of rotation corresponding to the drain mode of dishwasher cycle operation.

Most current household dishwashers exert some axial load on the motor as a result of water pump operation. This laod, as measured on some units, is as great as thirty three pounds toward the motor in the wash mode of the dishwasher, as viewed from the exposed shaft end. Axial load is approximately sixteen pounds in a direction away from the motor when the dishwasher is in the drain mode.

The majority of motors manufactured, regardless of application use, have the thrust load carried by thrust rings or washers placed on the motor shaft along one of the motor end shields. The motor end shields conventionally support the motor shaft, the shaft extending through at least one end shield. The free end of the shaft performs useful work. Conventionally, the thrust washers are placed on the shaft where it extends through the end shield, on each side of that end shield. These thrust washers, as their name implies, need be little more than metal or similar material shaped in the form of a conventional washer. Conventional thrust bearing washers work well for their intended purpose in the majority of motor applications. However, it has been found that the axial loads imposed by dishwasher operations impose too great of an axial load for their use.

As indicated above, dishwasher applications, commonly use a reversible electrical motor. That is, the motor is designed to provide both clockwise and counter-clockwise shaft rotation. One direction of rotation is used in the wash mode to pump water within the dishwasher, while the other direction of rotation is used in the drain mode to pump water from the dishwasher. The load imposed by the water pump varies with dishwasher mode of operation. Because of the comparatively high axial loads, motor manufacturers have been forced to use some form of ball or anti-friction bearing to accommodate the load over the useful life of the motor. Use of ball bearings substantially increases overall motor costs. In addition, ball bearings inherently are noisy and their use, particularly in domestic appliances, is undesirable. Our invention permits the continued use of low cost thrust washers even where the application subjects the motor to high thrust loads.

One of the objects of this invention is to provide a low cost thrust system for an electrical motor.

Another object of this invention is to provide a thrust system using thrust washers for the bearing surfaces.

Another object of this invention is to provide a thrust system that is quiet in operation.

Another object of this invention is to provide a thrust system having a floating bearing for distributing thrust load in at least one direction of the thrust load.

Yet another object of this invention is to provide a thrust system that distributes axial thrust load imposed on the motor over two thrust surfaces.

Still another object of this invention is to provide a thrust system that automatically will compensate for wear to the thrust system.

Yet another object of this invention is to provide a thrust system that reduces free end play or axial movement of the shaft.

Other objects will occur to those skilled in the art in light of the following description and accompanying drawings.

SUMMARY OF THE INVENTION

In accordance with this invention, generally stated, and improved thrust system is provided for distributing axial loads imposed on a rotating shaft.

The preferred embodiment is a bi-directional dynamoelectric machine having a rotating shaft supported by a pair of main bearings. A first end of the shaft has first and second fixed thrust bearings placed on each side of the main bearing. A second end of the shaft has a third thrust bearing which is spring loaded and always is seated whenever one of the first and second fixed thrust bearings is seated. Axial thrust load in one direction is carried by one of the first and second fixed bearings and the spring loaded thrust bearing while axial thrust load in the other direction, along with load imposed by the spring, is carried by the other of the first and second thrust bearings.

DESCRIPTION OF THE PREFERRED EMBODIMENT

Figure 1:
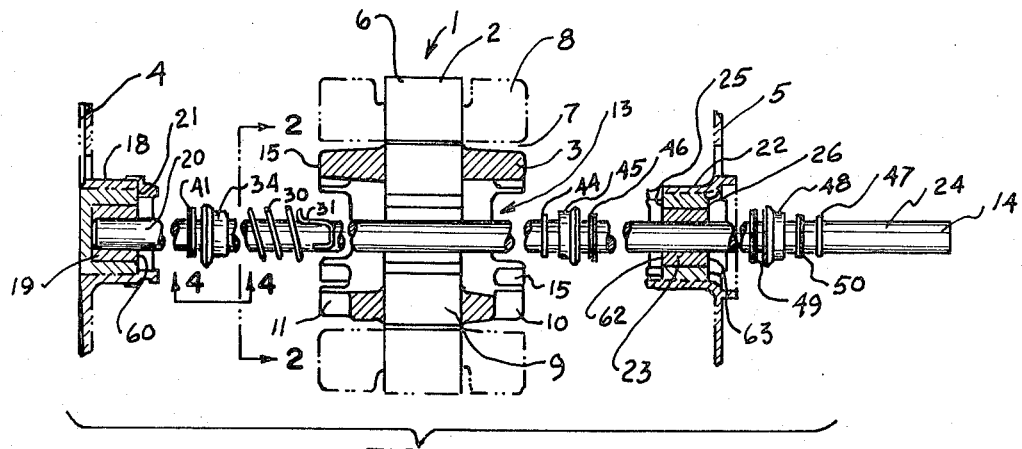
FIG. 1 is an exploded partial sectional view, partly broken away, of a dynamoelectric machine employing the thrust system of this invention.
Figure 2:
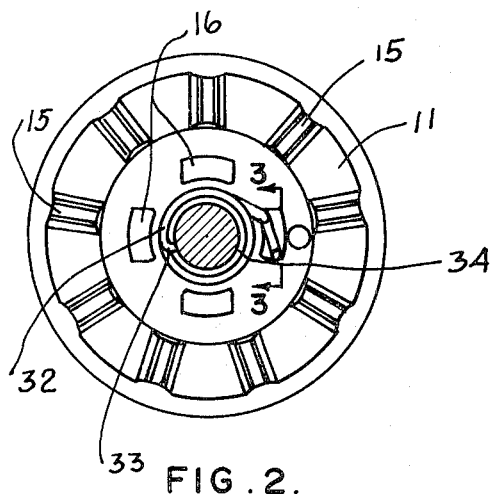
FIG. 2 is an enlarged sectional view, taken along the line 2—2 of FIG. 1.

Referring now to FIG. 1, reference numeral 1 indicates an electric motor having a stator assembly 2 and a rotor assembly 3 which operate in accordance with well known electrical principles. Conventionally, the stator assembly 2 and rotor assembly 3 are enclosed in some form of suitable covering, not shown. The covering conventionally is a cylindrical tube closed on a first end by an end shield 4 and on a second end by an end shield 5. The covering provides support for both the stator assembly 2 and the end shields 4 and 5 so as to form a single, rigid body.

Stator assembly 2 includes a core 6 conventionally constructed of laminated magnetic material. The core 6 has an axial opening 7 through it. Opening 7 has a plurality of slot openings, not shown, extending radially from it and positioned annularly about it. The slots receive a winding 8 in them, and the winding 8 is insulated from the core 6 by any suitable insulation system. The winding 8 may comprise a variety of electrical configurations. For example, for a single phase induction motor, the winding 8 would include a first winding part having wire turns arranged in two sets of electrical coils displaced 180° with respect to one another so as to form first and second electrical poles for the motor 1. A second winding part, likewise having two sets of electrical coils, forms the auxiliary winding for the motor 1. In the induction motor example, the two coil sets of the second winding part are placed in the slots approximately 90° from the main winding coils and displaced 180° with respect to one another so as to form first and second auxiliary poles for the motor 1. Other main and auxiliary winding configuration are acceptable.

Rotor assembly 3 is carried within the opening 7 and includes a core 9 of the squirrel cage type having end rings 10 and 11 on each of its ends. The core 9 is constructed from a plurality of stacked laminations 12. The core 9 has a shaft opening 13 in it which is designed to accept a shaft 14 through it. Shaft 14 may be inserted in the opening 13 and secured to the rotor assembly 3 by any convenient method. Both shrink and press fits work well.

The end rings 10 and 11 are conventional and may assume a variety of shapes, sizes and designs. As indicated above, the rotor assembly 3, in the embodiment illustrated, is a squirrel cage design. Consequently, the core 9 has a plurality of bar openings in each lamination 12 which are aligned to form the rotor bar slots. Conventionally, aluminum is cast to form the rotor bars simultaneously with the end ring structure, thereby forming the conventional rotor assembly 3. The particular rotor assembly 3 illustrated has end rings 10 and 11 having blades 15 on them. The blades 15 will be recognized by those skilled in the art as convenient means for generating air movement across the windings 8 of stator assembly 2 and conventionally are used for that purpose.

The particular lamination 12 used for the construction of the rotor assembly 3 has a plurality of vent openings 16 in it. The vent openings 16 commonly are provided in conventional rotor construction and when aligned in the rotor assembly 3, as shown, form a channel through the rotor core 9. Vent openings 16 permit passage of air through the core 9. While certain lamination 12 constructions eliminate the vent openings 16, we find it convenient to use at least a sufficient portion of laminations having openings 16 in them to define a channel 17. The purpose of channel 17 is described in detail hereinafter.

End shield 4 has a hub structure 18 formed in it, along a central portion of the shield 4. Hub structure 18 is conventional and includes a main bearing 19. Main bearing 19 receives an end 20 of the shaft 14. The bearing 19 both supports the shaft 14 and permits its free rotation. Main bearing 19 may comprise any of a variety of bearing constructions. Conventionally, bearing 19 has a thrust surface 21 positioned annularly about a face 60 of the bearing 19.

End shield 5 likewise has a hub structure 22 formed about its central area. Hub structure 22 houses a second main bearing 23. A free end 24 of shaft 14 extends through the bearing 23, is supported thereby and is free to rotate therein. Construction of bearings 23 and 19 are similar, except that bearing 23 permits passage of the shaft 14. Both bearings conventionally have some form of bearing cap enclosing them. Bearing 23 has a first thrust surface 25 and a second thrust surface 26 positioned annularly about a face 62 and a face 63 respectively, located on each side of the bearing 23. In the embodiment illustrated, the surfaces 21, 25 and 26 are formed by a thrust plate 27.

Figures 4, 5, 6:
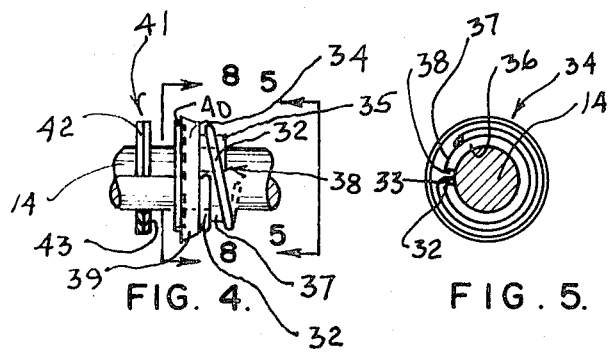
FIG. 4 is an enlarged view taken along the line 4—4 of FIG. 1.
FIG. 5 is a view taken along the line 5—5 of FIG. 4.
FIG. 6 is a plan view of a thrust retaining plate.
Figure 7:
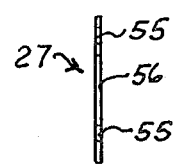
FIG. 7 is a view in side elevation taken along the line 7—7 of FIG. 6.
Figure 8:
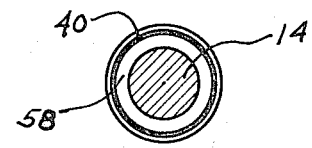
FIG. 8 is a sectional view taken along the line 8—8 of FIG. 4.

Thrust plate 27 is illustrated in FIGS. 6 and 7. As there shown, the plate 27 is a thin, annular design having a ring 28 which defines a surface 29. A plurality of support structures 55 extend radially outwardly from the ring 28. The structures 55 abut the faces 60, 62 and 63. The ring 28 defines a shaft opening 56. Use of the structures 55 enables thrust plate 27 to be used with a variety of shaft 14 sizes which inturn require various sized hub structures at the end shields 4 and 5. That is, shaft opening 56 may be varied diametrically which enables thrust plate 27 use over a variety of motor 1 sizes. The faces 60, 62 and 63 may extend radially inwardly along the structures 55 or those faces may be mere radial protuberances designed to engage the structures 55. Thrust plate 27 preferably is metal or a metal alloy having sufficient wear characteristics for the application requirement.

Figure 3:
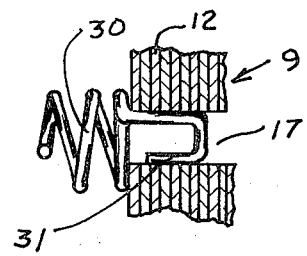
FIG. 3 is an enlarged sectional view taken along the line 3—3 of FIG. 2.

A spring 30 has a first end 31 and a second end 32. Spring 30 is mounted over the shaft 14 on the bearing 19 side of the rotor assembly 3. The end 31 is U-shaped in plan, as is best seen in FIG. 3. The U-shape of the end 31 is sized to fit the channel 17 in a tight, friction fit. The end 32 of the spring 30 has a radially inwardly projecting part 33. The part 33 is designed to engage a thrust collar 34.

Thrust collar 34 is a cylindrical section 35 having an axial opening 36 through it. Axial opening 36 receives the shaft 14 in a slip fit. Cylindrical section 35 is defined in part by an outer wall 37. Wall 37 has a groove 38 in it, running in an axial direction. The groove 38 receives the projecting part 33 of spring 30. Outer wall 37 extends radially outwardly to form a flange 39. Flange 39 has a peripheral lip 40 formed annularly about it. The lip 40 is designed to engage a thrust washer 41. That is, the lip 40 forms a rabbit 58 which is sized so as to accept a portion of the thrust washer 41 in a loose, friction fit.

Thrust washer 41 is a wafer construction having a phenolic-canvas base portion 42 and a rubber back portion 43 bonded to one another by any convenient method. The washer 41 has an axial opening through it and it is mounted on the shaft 14 in a friction fit. The spring 30, thrust collar 34, thrust washer 41 and thrust surface 21 form a first thrust means for the thrust system of motor 1 and they are shown illustratively positioned on the end 20 of the shaft 14.

The shaft 14 has a retaining ring 44 placed on it, positioned between the rotor assembly 3 and the face 62 of the end shield 5. The retaining ring 44 is a well known method of preventing movement along a shaft during shaft rotation. A thrust collar 45 and a thrust washer 46 are placed over the shaft 14, between retaining ring 44 and thrust surface 25. The collar 45 and washer 46 have basic construction features similar to the collar and washer described above. In the embodiment illustrated, however, the collar 45 fits the shaft 14 in a tight, friction fit, thereby prohibiting relative movement between the collar and shaft during rotation of the latter.

The end 24 of shaft 14 has a retaining ring 47 mounted over it. Retaining ring 47 is conventional and it too merely prevents movement along the shaft 14 during rotation of the shaft. A thrust collar 48 and a thrust washer 49 are positioned on the shaft 14 between retaining ring 47 and thrust surface 26. A plurality of shim washers 50 may be required to insure that the face of the thrust washer 49 is backed against thrust surface 26. As previously indicated, the washers 49, 46 and 41 are similar in construction, all being of wafered design. The phenolic portion 42 is used for the abutment of the washer and the various thrust surfaces. The use of shim washers 50 and the action of the spring 30 keep free end play of the shaft 14 to a minimum. That is, the motor 1 is constructed so that little movement of the shaft 14 is permitted in the axial direction, the shim washers 50 taking up most of the axial slack.

It may be seen, particularly by referring to FIG. 1, that thrust collar 45 and thrust washer 46 form a second thrust means for the thrust system of motor 1 while thrust collar 48 and thrust washer 49 form a third thrust means for the thrust system of the motor 1. While the thrust collar 48 and 45 may be similar to the thrust collar 34, we prefer to alter them slightly. Since neither thrust collar 45 or 48 hold the spring 30, they do not require the groove 38 and that groove is eliminated in both of those collars. Further, the design of thrust collar 45 may be varied. For example, space requirements between the rotor assembly 3 and the end shield 5 may necessitate the use of a simple retaining plate for thrust collar 45. That is, the axial distance between the rotor assembly 3 and the end shield 5 may be so small, in certain applications, that the axial length of thrust collar 45 must be reduced. The use of two separate parts for the various collars and washers described above, while preferred, is not mandatory. Thus, each of the collars and washers may be integrally constructed, if desired.

Operation of the thrust system of this invention is extremely effective. For illustrative purposes, assume that the wash mode of the dishwasher application for the motor 1 exerts a force tending to draw thrust washer 46 and thrust collar 45 against thrust surface 25. Merely by way of example, it has been found that this force, in at least one dishwasher application, approximates 16 pounds. The shaft 14, in the assembly of the motor 1, is placed in the end shield 4 so that the spring 30 is in compression. We have found that a spring force of approximately ten pounds, for most dishwasher applications, works well. The end 20 of the shaft 14 then always has the spring force of ten pounds being exerted on it. In prior art thrust systems, the shaft end 20 carried little of the axial load, most of that load being carried on the end shield 5 end of the motor. The thrust collar 48 and thrust washer 49 are positioned so that they abut thrust surface 26 whenever the spring 30 is under its ten pound compression force.

The thrust means represented by collar 34, washer 41, and surface 21; and collar 48, washer 49, and surface 26 are the thrust bearings utilized when the motor 1 is in its other mode of operation, and the force exerted is towards the motor 1. Thus, assuming direction of rotation for the rotor assembly 3 so as to exert force away from the motor 1, collar 45, thrust washer 46 and surface 25 must be capable of handling an axial force of approximately 16 pounds exerted by the water pump and the 10 pounds exerted by the spring 30 for a total of 26 pounds. This load is within the area of safe operation for thrust bearings shown and described. In the opposite direction of rotation, the first 10 pounds of axial thrust are carried by the collar 34, washer 41, and thrust surface 21. After the first 10 pounds of force, the thrust means comprising thrust collar 48, washer 49, and surface 26 easily share the remaining load. Again, merely by way of example, it has been found that the load in a direction toward the motor approximates 33 pounds in certain applications. We have distributed the load so that the thrust means on the shaft end 20 assumes a portion of the axial thrust load while the thrust means on the shaft end 24 carries the remaining portion, in this instance, 10 and 23 pounds, respectively. In general, the spring load is selected to distribute the major load on the motor 1 which commonly also corresponds to the greater percentage of operational time of the unit and the spring load is added to the minor load of the application, which conventionally is for the least amount of operational time.

Numerous variations, within the scope of the appended claims, will occur to those skilled in the art in light of the foregoing description and accompanying drawings. Thus, the floating thrust bearing means may be used on either end of the motor 1, although it is shown and described only on the shaft end 20 of the motor 1. While we find it convenient to utilize the channel 17 to mount end 31 of the spring 30, special mounting means may be provided in other embodiments of our invention. The design of the attachment means between the spring 30 and thrust collar 34 may be changed. For example, the end 32 of spring 30 may be embedded in the collar 34 rather than utilizing the interlocking attachment of the groove 38 and the part 33 of spring 30. We find the use of thrust plate 27 a convenient device for the bearing surfaces 21, 25 and 26. However, the faces 60, 62 and 63 of the end shields 4 and 5 may be machined and used as the bearing surfaces. We have found thrust plate 27 superior in operation and lower in cost than the machining operation. Other designs for thrust plate 27 are compatible with the broader aspects of our invention. Certain conventional features of the motor 1 may vary. Thus, the end shield design, the end ring design, and the retaining ring 44 may be altered. For example, the shaft 14 may have a notch formed in it and positioned so as to abut collar 45, replacing the ring 44. Likewise, certain motor designs eliminate the use of a stator covering, the end shields and stator assembly providing the necessary structural support. The thrust washers while preferably of the described wafer design, may be constructed from a single material. While the thrust system of our invention was discussed in relation to a particular motor load, it will be apparent to those skilled in the art that both the application and load may change. These variations are merely illustrative.

Having thus described the invention, what is claimed and desired to be secured by letters Patent is:

1. An electric motor and thrust system therefore comprising:
    a first end shield;
    a shaft rotatably supported by said first end shield at a first end of said shaft;
    a rotor mounted to said shaft;
    a first thrust washer mounted on said shaft between said first end shield and said rotor;
    a thrust collar mounted to said shaft inboard of and abutting said first thrust washer;
    a compressed spring connected to said thrust collar exerting force in an axial direction along said shaft;
    a second end shield for rotatably supporting said shaft at a second end of said shaft, said rotor being positioned between said first and said second end shields, said second end shield having an opening in it permitting passage of said shaft;
    a second thrust washer mounted on said shaft between said rotor and said second end shield; and
    a third thrust washer mounted on said shaft outboard of said second end shield.

2. The motor of claim 1 wherein said thrust collar is a cylindrical section having an axial opening in it for receiving said shaft, said cylindrical section having a radially outwardly extending flange at a first end of said section and an axial groove in it along a second end of said section.

3. The motor of claim 2 wherein said spring has a radially inwardly extending part adapted for insertion in said groove of said thrust collar.

4. The motor of claim 3 wherein said rotor has a channel in it and said spring has a second end adapted for insertion in said channel.

5. The motor of claim 4 wherein each of said thrust washers are a wafer design having a phenolic part and a backer part mounted to one another.

6. The motor of claim 5 further characterized by a plurality of thrust plates mounted on said shaft, one each of said thrust plates being placed on said shaft so as to abut said phenolic wafer part of said first, second and third washers, said thrust plate comprising an annulus having an axial opening therethrough.

7. A system for distributing axial loads on a rotating shaft comprising:
    a first shaft support;
    a shaft rotatably supported by said first shaft support at a first end of said shaft;
    means for rotating said shaft operatively connected to said shaft;
    a first thrust washer mounted on said shaft inboard of and adjacent said first shaft support;
    a thrust collar mounted to said shaft inboard of and abutting said first thrust washer;
    a spring connected to said thrust collar and compressed to exert a force in an axial direction along said shaft;
    a second shaft support for rotatably supporting said shaft at a second end of said shaft, said second shaft support having an opening in it permitting passage of said shaft;
    a second thrust washer mounted on said shaft inboard of and adjacent said second shaft support; and
    a third thrust washer mounted on said shaft inboard of and adjacent said second shaft support.

8. The system of claim 7 wherein said thrust washer is a wafered design having at least a phenolic part and a backer part mounted to one another.

9. The system of claim 8 further characterized by a thrust plate mounted on said shaft intermediate each of said thrust washers and said first and second shaft supports, said thrust plates comprising an annular body having an axial opening through it, and a plurality of structure extending radially outwardly from said body part.

10. The system of claim 9 wherein said thrust collar comprises a cylindrical section part having a first and a second end, said cylindrical section part having an axial opening through it, and a radially outwardly extending flange integrally formed at said first end of said cylindrical section part, said flange having an annular lip extending axially outwardly from it, sized diametrically to receive one of said thrust washers in a slip fit.

11. The collar of claim 10 wherein said cylindrical section part has an axial groove in it, along said second end, a first end of said spring being operatively connected to said collar along said axial groove.

12. The system of claim 11 adapted for use in a dynamoelectric machine, said rotating means comprising a rotor mounted to said shaft between said first and said second shaft supports, said first and said second shaft supports comprising end shields for said dynamoelectric machine.

13. An electric motor and thrust system therefor comprising:
    a first end shield;
    a shaft rotatably supported by said first end shield at a first end of said shaft;
    a rotor mounted to said shaft;
    first thrust distribution means about said shaft along said first end shield;
    a thrust collar mounted to said shaft inboard of and abutting said first thrust distribution means;
    a compressed spring connected to said thrust collar exerting a force in an axial direction along said shaft;
    a second end shield for rotatably supporting said shaft at a second end of said shaft, said rotor being positioned between said first and said second end shields, said second end shield having an opening in it permitting passage of said shaft;
    second thrust distribution means about said shaft along the inboard side of said second end shield; and
    third thrust distribution means about said shaft along the outboard side of said second end shield.

14. The motor and thrust system of claim 13 wherein said first, said second and said third thrust distribution means include a thrust washer mounted on said shaft, said thrust washer being a wafered design having at least a phenolic part and a backer part mounted to one another.

* * * * *